Sept. 19, 1933. A. C. HURRELL ET AL 1,927,285
GLARE ELIMINATOR
Filed Feb. 4, 1932

A. C. HURRELL
and
E. G. MINNEMAN:
Inventors;

By Robert M. Caudle,
Attorney.

Patented Sept. 19, 1933

1,927,285

UNITED STATES PATENT OFFICE 1,927,285

GLARE ELIMINATOR

Albert C. Hurrell and Edward G. Minneman, Richmond, Ind.

Application February 4, 1932. Serial No. 590,924

1 Claim. (Cl. 240—48.6)

The invention relates to the science of optics, and the primal object which we have attained is the provision of a glare eliminator for the headlights of vehicles, the same being very simple in construction, easily installed, highly efficient in operation, and which can be manufactured and sold at a comparatively low price.

In the operation of automobiles one of the greatest hazards, especially at night, is the glare emanating from headlights of other automobiles approaching either from the front or the rear, and the especial object of this invention is to overcome said hazard, and that without diminution of the light required for the proper functioning of the automobile with which they are operatively connected, as herein particularly specified.

Other objects and particular advantages of our invention will be suggested in the course of the following description, and that which is new and useful will be correlated in the appended claim.

The preferred means for carrying out the principles of our invention in a practical, economical, and highly efficient manner, is shown in the accompanying one-sheet of drawing, in which—

Figure 1:
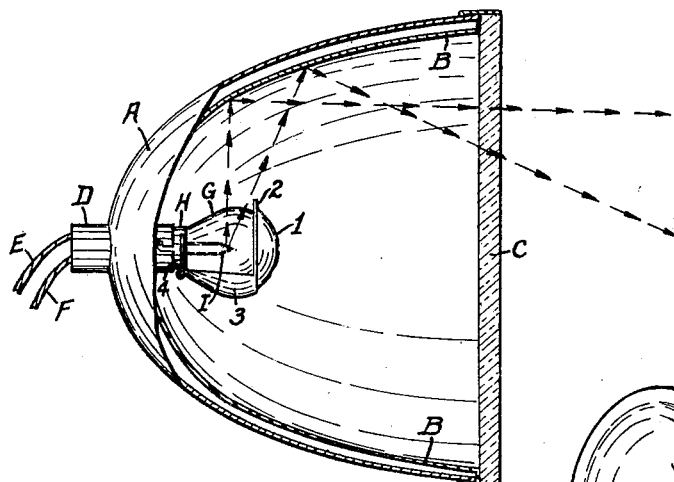
Figure 4:
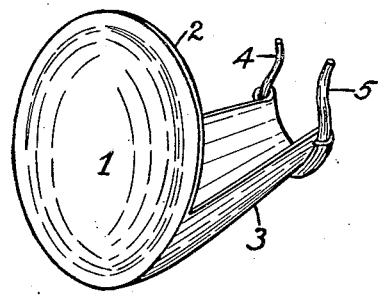
Figure 3:
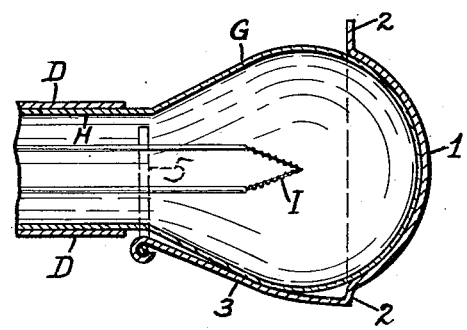
Figure 2:
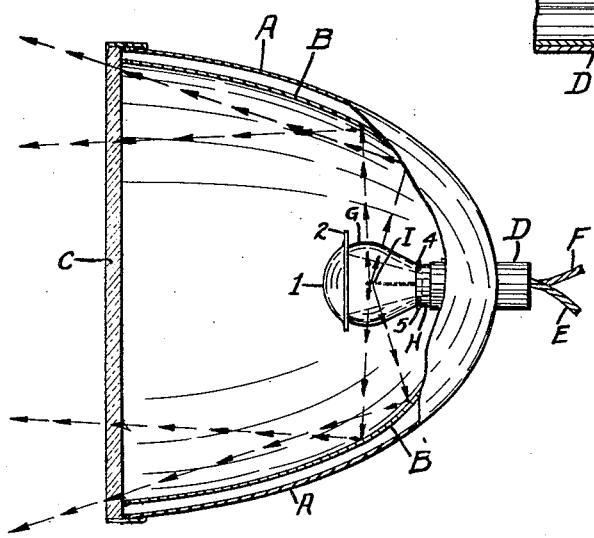

Figure 1 is a side elevation of a head-lamp, the same being shown as partly broken away, in order to show our invention as installed in connection with light bulb therein, and indicating by arrows the normal directions which will be taken by the light rays as they issue from the lamp. Figure 2 is the same as Fig. 1, except that it is taken at right-angles thereto, that is looking directly downwardly into the lamp. Figure 3 is a central vertical section of our device and of a light-bulb and its connection therewith, And Figure 4 is a perspective view of our invention alone.

Similar indices designate like parts throughout the several views.

In order that the construction, the installation, and the operation of our invention may be more fully understood and appreciated, we will now take up a detailed description thereof, in which we will set forth the same as fully and as comprehensively as we may.

The associated parts, which are indicated by letters of reference, include the bowl or body A of an electric head-lamp, in which is secured the concave reflector B, the forward end of the lamp being closed by the crystal, or other transparency, C. Secured in the convergent rear end of the body A, and also projecting through the center of the reflector B, is the socket member D, from which issue the wires E and F which lead to respective negative and positive elements to form an electric circuit.

Numeral G designates an ordinary electric light bulb, whose stem H fits snugly in the socket D, where it is detachably secured, and whereby an electric circuit will be formed through the filament I, therein, and through the wires E and F to the source of power.

Said parts are merely shown to make clear the installation and the operation of our invention, and no claim per se is made thereto, and we are not to be limited to the construction thereof.

Our invention in itself resides in the following described parts which are designated by numerals, as follows: Numeral 1 denotes a circular disc-like cap, which is concavo-convex in shape and it is formed, preferably, of thin metal or other opaque material, and it is adapted to fit snugly in contact with the free forward end portion of an electric light bulb G, as shown, and its concave surface may be made reflective, or radioactive, in some instances although this is not an essential requisite.

Extending outwardly from around the periphery of the cap 1 is a flange 2, which projects at right-angles, or nearly so, to the axis of the bulb G, and whose purpose and importance will hereinafter be fully particularized.

Numeral 3 denotes the cradle, which also acts as a retaining arm and also as a concave reflector, and it forms a rearward extension of the cap 1, to which it is secured or is formed integral therewith. The inner or contact surface of the cradle 2 is refluent, whereby it will act as a reflector substantially at right-angles to the cap 1. Said cradle tapers slightly from the cap 1 to its rear terminal, substantially as indicated. Attached to and projecting at substantially right-angles from the rear end portion of the cradle member 3, are the resilient or spring-like prongs 4 and 5, which are formed to project arcuately in embracing relation with the stem portion H of the bulb G, or with the socket member D.

The placing and functioning of our device may be described as follows: No preliminary preparations are required to install our device, as one has only to obtain access to the interior of the head lamp. After which one has only to bring the device to position by placing the concave face of the head 1 into approximately nesting contact with the front end of the light bulb G, then turning the cradle 3, bringing it upwardly against the bulb, with its rear end in contact with the stem H of the bulb, which, manifestly, will cause the prongs 4 and 5 to be slightly distended, with relation to each other, until their free ends have passed slightly beyond half-way around the stem of the bulb, where they will, of their own resiliency, closely embrace the stem of the bulb and thereby retain the device in operative position, as in Fig. 3.

As there are usually two head-lamps to an automobile it is evident that one of our devices should be attached to each, as stated.

With the installation completed, as stated, no further attention is required, as they will then be ready at all times to automatically function as follows: The light developed in each bulb will not be disturbed, and the lamp reflectors will be fully illuminated as before, except that the two sources of objectionable glare will be eliminated. That is to say, first, that the direct rays of light from the filaments I will be deflected back upon the lamp reflectors, whereby their objectionable glaring rays will be modified and whereby they will not form a glare, but will continue to produce the proper vision ahead of the automobile. Secondly, the rays of light which usually project downwardly from the bulb have, heretofore, been reflected upon the lower portion of the lamp reflector and by the latter were reflected upwardly and forwardly into the vision of the driver of an approaching automobile. Our device entirely eliminates this second objectionable feature, as the rays of light which are usually directed downwardly are cut off by the reflector cradle 3 and are deflected upwardly to the upper part of the lamp reflector and then by it are projected downwardly and forwardly to the roadway, whereby they will be of material advantage to the driver and without any disadvantage to the occupant of the approaching automobile.

Other important features of our invention reside in the flange 2. This flange accomplishes various important purposes, first, it prevents the otherwise necessity of having the cap portion of our device extend rearwardly further over the bulb than that shown, in order to cut out all the objectionable rays of light; and by having the cap 1 comparatively short, as shown, the rays of light will be diverted in such manner that there will be no detrimental results, to the driver of the car on which it is located or to the driver of an approaching car.

One purpose of the flange 2 is that by reason of it extending outwardly even with the extent of the bulb 1 is that it obstructs the rays of light from the bulb which would otherwise strike the forward portion of the main reflector. Also by reason of the said flange extending directly outwardly, in combination with the other elements of our construction, we are able to position the light-bulb on a true horizontal plane, in place of at an angle vertically, as required without its employment.

Collectively considered, our invention removes, or rather prevents, all of the objectionable features of bright head-lamps, and at the same time preserves all of the desirable features thereof, as well as contributing importantly to improvements in night-driving conditions both to the driver who has our invention installed on his car, and to the driving of other automobiles in proximity therewith.

While we have shown and described our invention as associated with the head-lights of automobiles, it is to be understood that our invention is not to be limited thereto, as the principles and the main features thereof may be employed with other light bulbs or the like and for other purposes which need not be detailed herein, such for instance, as light bulbs in public or private buildings, and in various other kinds of indirect lighting systems.

Having now fully shown and described our invention, what we claim and desire to secure by Letters Patent of the United States, is—

In combination with a head-lamp for vehicles, with a light-bulb extending directly forward on a horizontal plane and having a stem adapted to be secured in a socket; a glare eliminator detachably connected to said bulb and consisting, in combination with each other, of a concavo-convex disc-like cap fitting tightly over and covering the free end of said bulb, a flat flange extending entirely around and directly outward at right-angles to the said stem of the bulb and integral with said cap, a concavo-convex tapering cradle with its larger end formed integral with an edge portion of said flange and forming a rearwardly directed portion thereof and contacting with the larger peripheral portion of said bulb, from which it follows the contour of the bulb to the conjunction of the bulb with its metal stem, said cradle being formed tapering from the cap to the rear terminal, a pair of oppositely disposed arcuate-shaped prongs extending at right-angles from and rigidly secured to the rear end of said cradle and in embracing relation to said stem for securing the device in operative connection with said bulb, all substantially as shown and described and for the purposes set forth.

ALBERT C. HURRELL.
EDWARD G. MINNEMAN.